United States Patent
Weng et al.

[11] Patent Number: 5,816,062
[45] Date of Patent: Oct. 6, 1998

[54] AIR CONDITIONING SYSTEM WITH SUPPLEMENTAL ICE STORING AND COOLING CAPACITY

[75] Inventors: Kuo-Lianq Weng; Kuo-Liang Weng, both of Taichung, Taiwan

[73] Assignee: Yu Feng Enterprise Co., Ltd., Taichung Hsien, Taiwan

[21] Appl. No.: 784,266

[22] Filed: Jan. 15, 1997

[51] Int. Cl.[6] ........................................ F25D 3/00
[52] U.S. Cl. .................... 62/201; 62/59; 62/180; 62/430
[58] Field of Search .............. 62/434, 430, 185, 62/201, 59, 186, 180, 203, 204, 139; 165/10 A

[56] References Cited

U.S. PATENT DOCUMENTS

| | | | |
|---|---|---|---|
| 2,185,022 | 12/1939 | Candor | 62/201 X |
| 4,735,064 | 4/1988 | Fischer | 62/430 |
| 4,916,916 | 4/1990 | Fischer | 62/430 X |
| 5,211,029 | 5/1993 | Uselton et al. | 62/59 X |
| 5,255,526 | 10/1993 | Fischer | 62/59 |
| 5,598,716 | 2/1997 | Tanaka et al. | 62/185 |
| 5,682,752 | 11/1997 | Dean | 62/201 X |

Primary Examiner—Harry B. Tanner
Attorney, Agent, or Firm—Browdy and Neimark

[57] ABSTRACT

The present air conditioning system with ice storing and cooling capacity can generate and store ice in its pipe assembly or in an ice storage tank particularly equipped for the system, depending on the type of the air conditioning system. The system is characterized in particular in that ice can be produced and stored in the air conditioning system whereby the time of supplying cooled air can be effectively extended with the merit that the operation cycle of the on and off of the compressor can be prolonged, extending the operation lifespan of the compressor in one aspect. In another aspect, ice production and storage in great amount can be performed in an off-peak period of the electrical power consumption and the stored ice can be utilized in the peak period of the power consumption so as to provide supplemental cooling capacity for the compressor of the air conditioning system whereby the shift of peak and off-peak power consumption can be effected with ease. The present air conditioning system can lower the installation expense for an ice-storing air conditioning system and can also be applied to an old conventional air conditioning system.

8 Claims, 8 Drawing Sheets

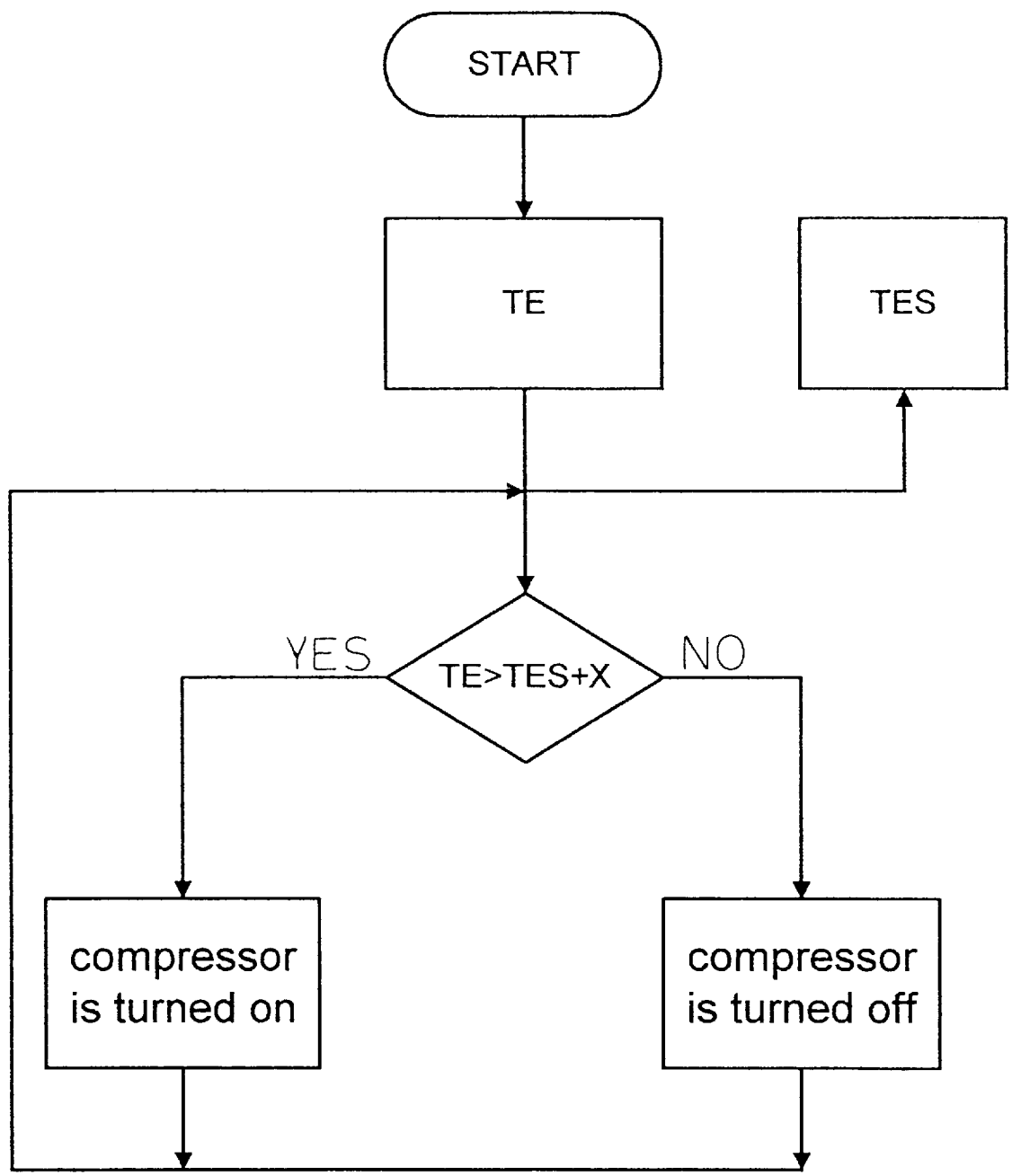
F I G. 2

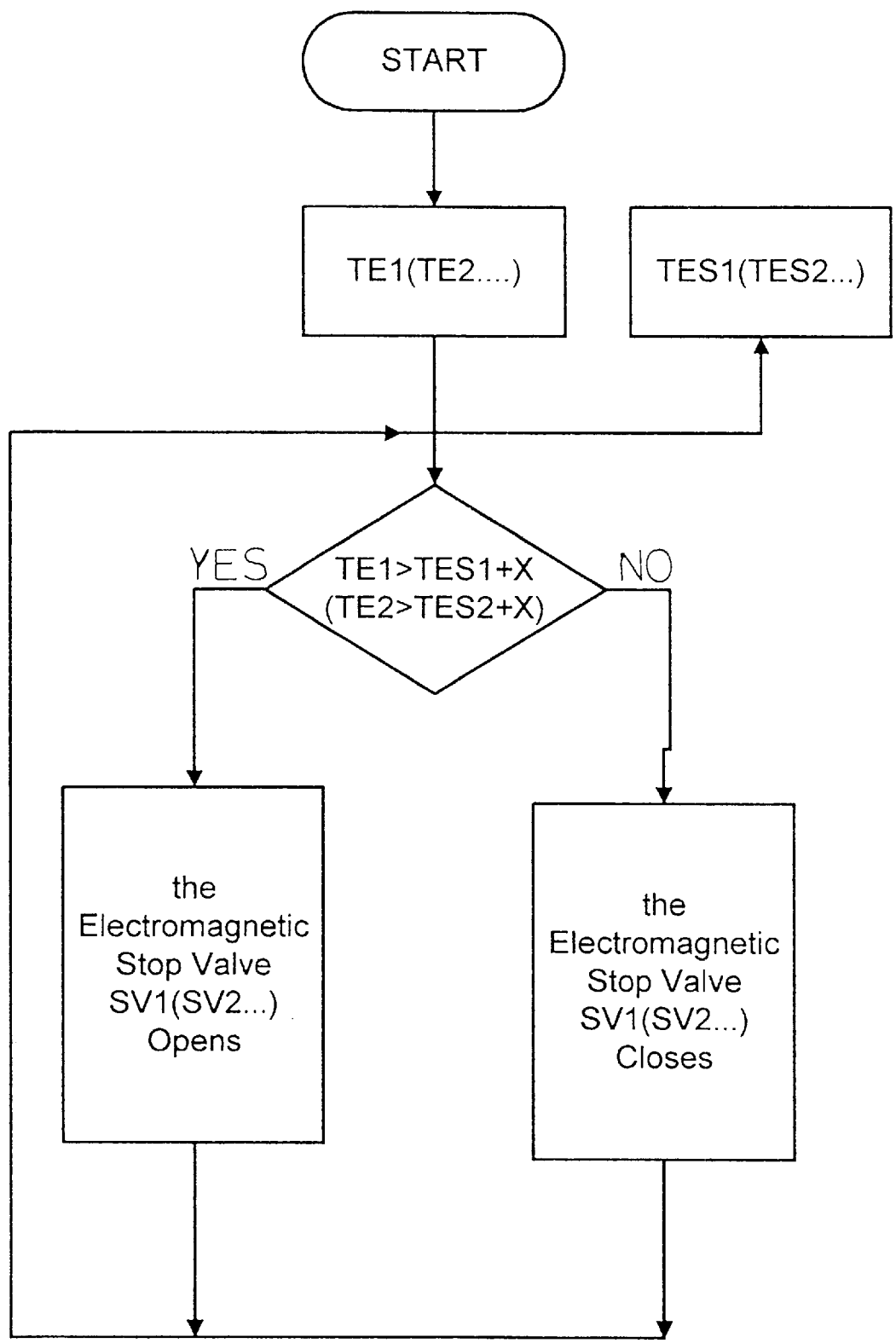
F I G. 6

AIR CONDITIONING SYSTEM WITH SUPPLEMENTAL ICE STORING AND COOLING CAPACITY

BACKGROUND OF THE INVENTION

The present invention relates to an air conditioning system with supplemental ice storing and cooling capacity which basically can generate and store ice in its pipe assembly or in an ice storage tank.

In general, the compressor of a conventional air conditioner is turned on and off automatically in an operation cycle, i.e., as the air temperature of a certain enclosed area to which cooled air is supplied by the air conditioner reaches a preset temperature, the compressor stops operating. Till the room temperature rises again higher than the preset one, the compressor starts to work again. In such a manner the compressor is turned on and off in a certain cycle, depending on the outside temperature of the room and other factors. The turning on and off of a compressor at a high frequency reduces the lifespan of the compressor dramatically. So, the reduction of the frequency of turning on and off of a compressor is the best approach to prolong the lifespan of the same.

Moreover, when the air conditioner is in an off state, the moisture accumulated on a pipe assembly thereof can be easily brought back in circulation into an enclosed air conditioned room, increasing the latent-heat burden of the air conditioner and rapidly rising the moisture of the room, making people in the room feel uncomfortable. Then the compressor is started again, resulting in shortening of the on and off cycle of the compressor and making the operation lifespan of the compressor accordingly short.

To solve the above cited problem, air conditioning systems with cooling ice storage device have been developed accordingly. But such a system must be equipped with an ice storage device which takes up a large space in one aspect. In another aspect, the cost of installation of such kinds of system is relatively high. Moreover, the moisture feedback problem associated with a conventional air conditioner still can not be tackled at all.

SUMMARY OF THE INVENTION

Therefore, the primary object of the present invention is to provide an air conditioning system with supplemental ice storing and cooling capacity which can store ice in the pipe assembly so as to prevent the moisture drops on the pipe assembly from feeding back into an air conditioned room.

Another object of the present invention is to provide an air conditioning system which can produce and store ice in an off-peak period of power consumption so as to be able to shift power consumption from a peak to an off-peak peroid effectively.

One further object is to provide an air conditioning system which can produce and store ice directly in a pipe assembly so that no extra space is needed to place an ice storage device.

One further object is to provide an energy efficient air conditioning system and prolonging life span of the compressor thereof as a result of the extension of the span of an on/off cycle of the compressor.

BRIEF DESCRIPTION OF THE DRAWINGS

FIG. 2 is a diagram showing the systematic structure of the second embodiment;

FIG. 6 is the control flow chart of the electromagnetic stop valve of the second embodiment;

DETAILED DESCRIPTION OF THE PREFERRED EMBODIMENTS

Figure 1:
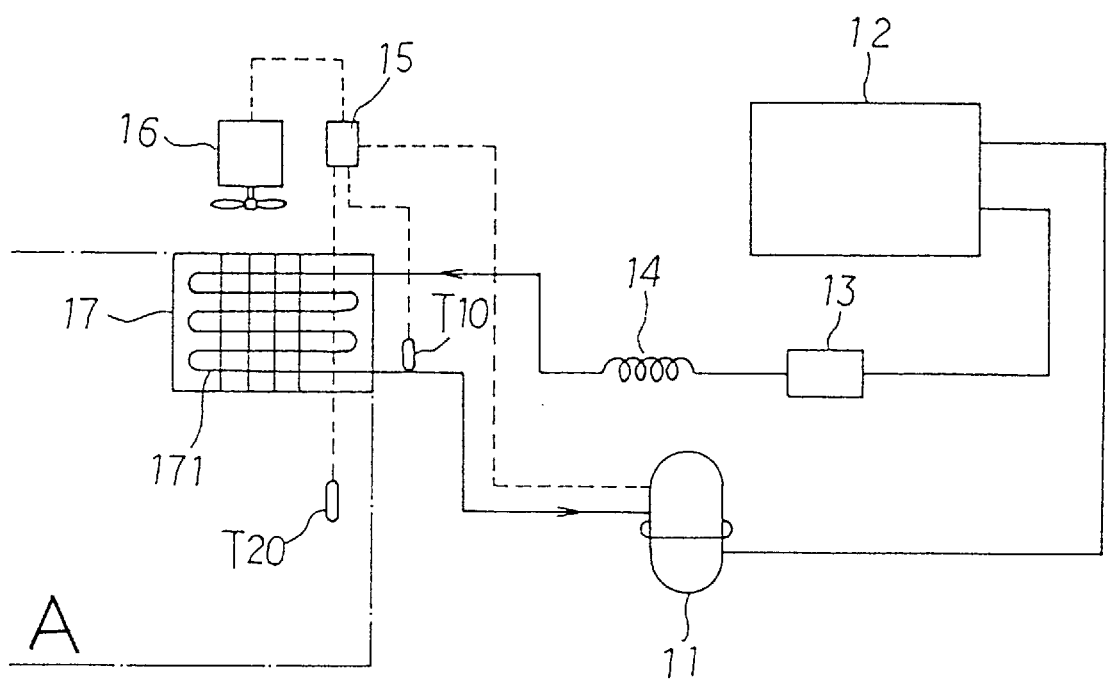
FIG. 1 is a diagram showing the systematic structure of the first embodiment of the present invention.

Referring to FIG. 1, the first embodiment of the present invention is a mono-evaporator-pipe-assembly air conditioning system which suits for a window mounted type, separating type, boxed type and vertical expansion type air conditioners. Such a system is comprised of a compressor 11, a condenser 12, a dryer unit 13, a coolant volume controller 14, a control unit 15, a fan motor 16, an evaporator 17 and detectors T10, T20 and etc., Cooled air is supplied to a room A.

Coolant is compressed in the compressor 11 and then delivered to the condensor 12 for condensation and to the dryer unit 13, via the coolant volume controller 14, and to the evaporator 17. Afterwards, the coolant undergoes an evaporation process so as to produce cooled air in room A which is blown away by a fan driven by the fan motor 16.

The coolant undergone heat transfer in the evaporator 17 is fed back to the compressor 11 at last to complete an operation cycle. The detector T10 is installed on the backflow pipe of the evaporator 17 for detection of the output temperature TE thereof so that the control unit 15 can transmit a signal in response to the outcome of the comparison between TE and a preset temperature TES for control of the on/off of the compressor 11. The speed of the fan motor 16 is variable. When the speed of the fan motor 16 is decreased with the air volume delivered per unit time by the fan dropped accordingly to such an extent that ice begins to build up on the wound pipe assembly 171 of the evaporator 17. The amount of the ice built up on the pipe 171 can be controlled by the constant monitor of the output temperature TE of the evaporator 17 by way of the detector T10, keeping the amount of ice under a certain level by variation of the speed of the fan motor 16. In other words, as long as the temperature TE is kept within a preset value, the amount of ice of the pipe 171 will be controlled accordingly.

The amount of ice can also be controlled if detector T10 is a photoelectric or pressure detecting means. Thus, the ice accumulated on the pipe assembly 171 can still keep the temperature of the room A down by a fan driven by the fan motor 16 even if the compressor 11 is stopped, removing the latent heat in the room A so as to prevent the moisture in the pipe from being red back.

The other detector T20 is used to monitor the temperature TA of the room A. The detected temperature TA is delivered to the control unit 15 for comparison with a preset temperature TAS and a signal in correspondence to the comparison is produced to control the operation speed of the fan motor 16 so as to keep the room temperature TA of room A within a set range.

Figure 3:
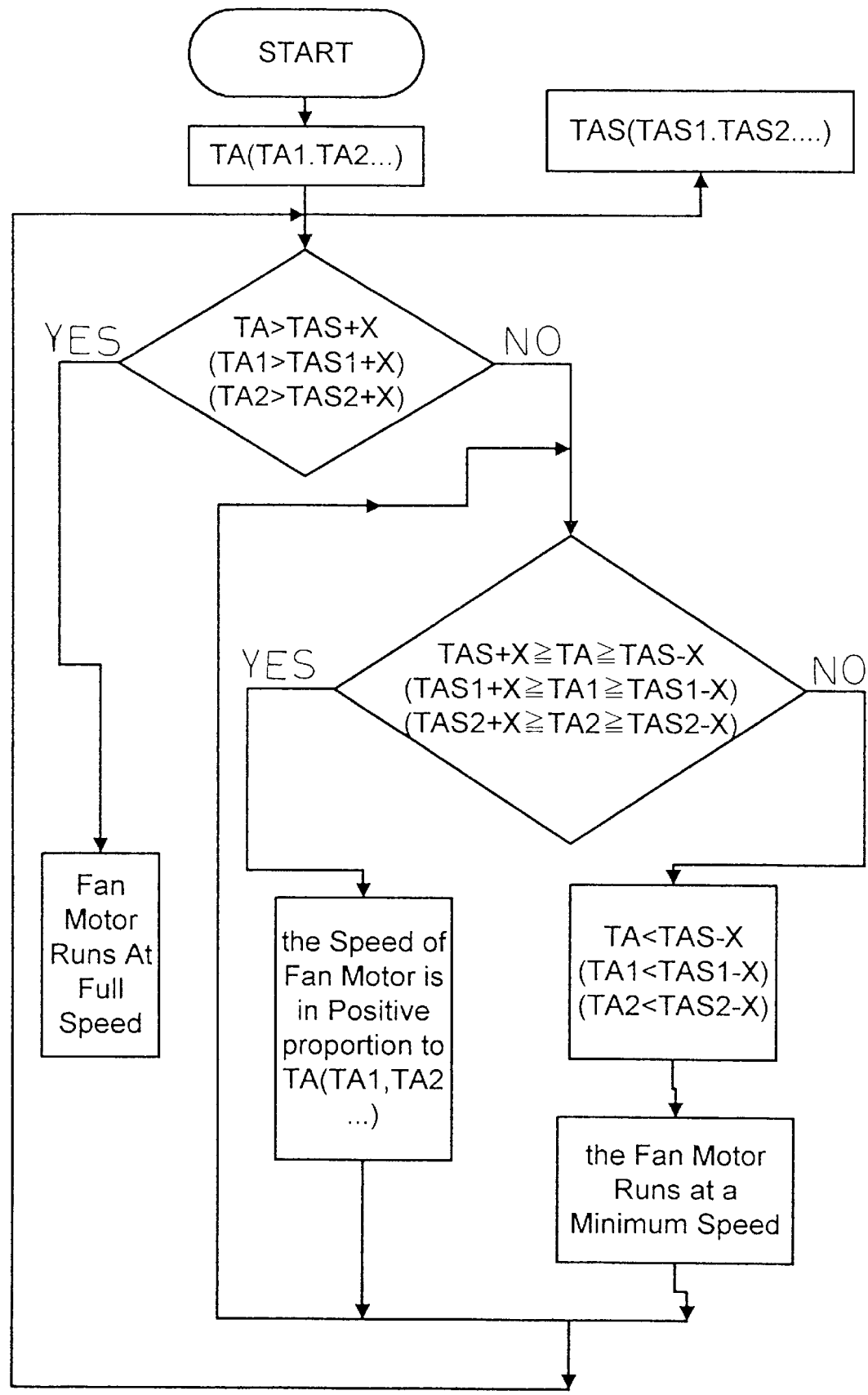
FIG. 3 is the control flow chart of the compressor used in the first embodiment.
Figure 4:
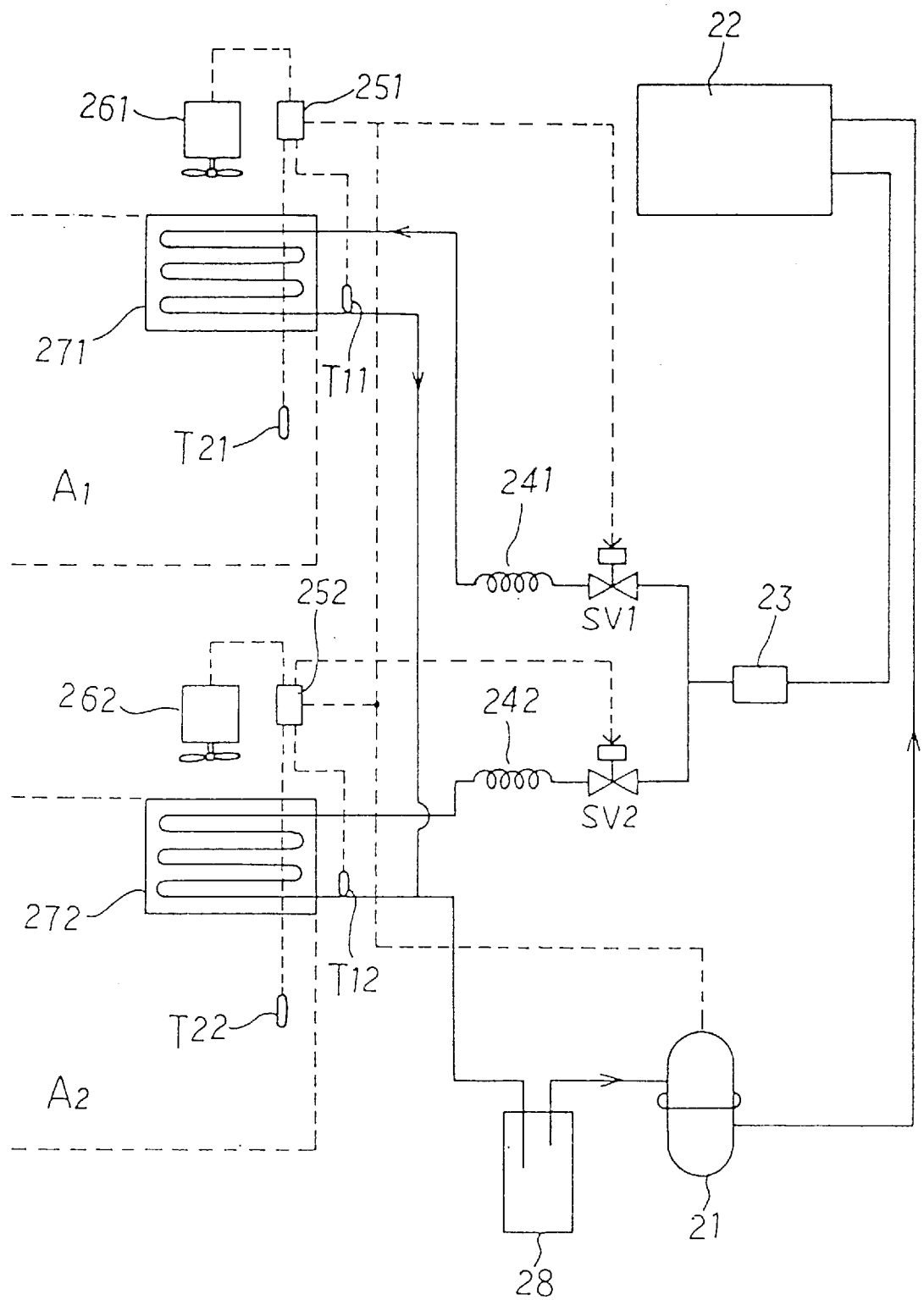
FIG. 4 is a diagram showing the control flow chart of the fan motor in the first and second embodiment.

As described above, the detector T10 can be used to control the amount of ice built up in the pipe assembly 171 of the evaporator 17 within a proper range and prevent the temperature of the coolant from being excessively low. The detector T20 is responsible for keeping the temperature TA of the room A within a fixed range. In the meantime, to achieve the above cited control goals, the compressor 11 and fan motor 16 are operated in accordance to the following procedures, as shown in FIGS. 3, 4.

1. When TE>TES+X, X standing for a set temperature difference between the ON and OFF states of the compressor 11, the compressor 11 is turned on; when TE≦TES−X, the compressor 11 is turned off.
2. When TA>TAS+X, the fan motor 16 runs at full speed; when TAS+X≧TA≧TAS−X, the speed of the fan motor 16 is proportional to the temperature TA; furthermore, when TA<TAS−X, the fan motor 16 runs at a minimun speed which can be set at zero.

Referring to FIG. 2, the second embodiment of the present invention is basically the same system as the first embodiment only equipped with one additional evaporator. It suits for application to a central vertical expansion type system, an air conditioner with multiple separating divisions and etc., i.e. a system with one compressor or more than one compressor in combination with a plurality of evaporators. It is comprised mainly of a compressor 21, condenser 22, a dryer 23, liquid collector 28 and two or more than two electromagnetic stop valves (SV1, SV2 . . . ), coolant volume controllers (241, 242 . . . ), evaporator (271, 272 . . . ), control units (251, 252 . . . ), fan motors (261, 262 . . . ), detectors(T11, T21, T12, T22 . . . ) supplying cooled air respectively to rooms (A1, A2 . . . ).

Figure 5:
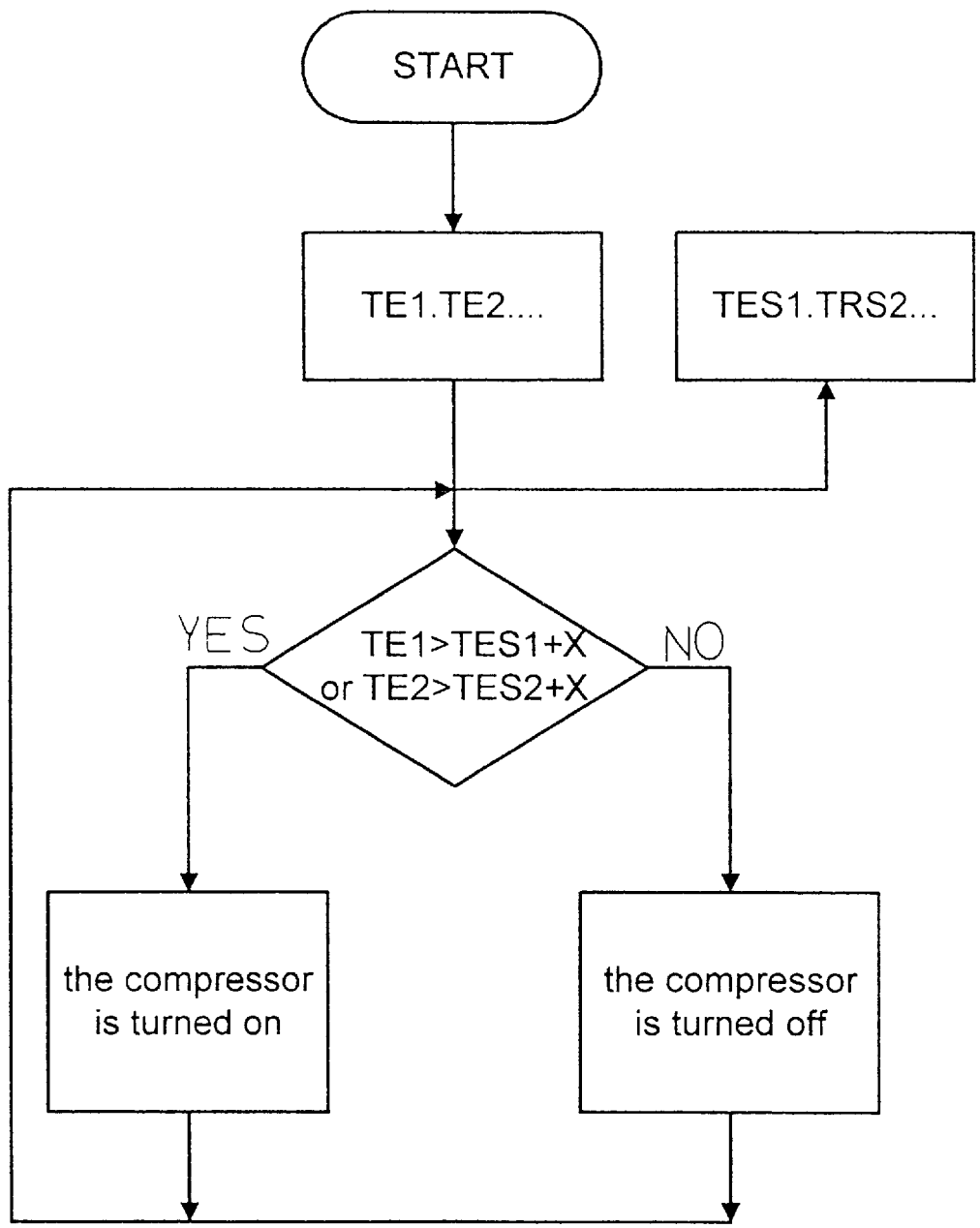
FIG. 5 is the control flow chart of the compressor used in the second embodiment.

As the compressor 21 is in operation to supply coolant to the condensor 22, dryer 23 via a pipe line and then is delivered separately via the electromagnetic valves (SV1, SV2 . . . ), coolant volume controllers (241, 242 . . . ) and the evaporators (271, 272 . . . ) for evaporation purpose of the respective distribution pipe lines, supplying cooled air respectively to rooms (A1, A2 . . . ). The detector T11 is installed on the back-flow pipe of the evaporator 271 for detection of the output temperature TE1 of the evaporator 271, and the detector T12 is mounted onto the back-flow pipe of the evaporator 272 for detection of the output temperature TE2 thereof. Then, the control units 251, 252 control the on and off of the compressor 21 in accordance with the comparison results of TE1 with TS1, and TE2 with TES2. In other words, when TE1>TES1+X or TE2>TES2+X, the compressor 21 is turned on to operate; and when TE1≦TES1−X and TE2≦TES2−X, the compressor 21 is turned off, as shown in FIG. 5, i.e., as long as the output temperature TE of any one of the evaporators (271, 272 . . . ) in the system is higher than the set temperature TES+X, the compressor 21 is turned on.

However, in case one of the output temperature of the evaporators is higher than a set temperature, it does not mean the output temperatures (TE) of all other evaporators are higher than the respective preset temperatures, requiring the supply of cooled air. So, on each distribution branch pipe, is installed an electromagnetic stop valve SV1, SV2 . . . for control of the in and out of the coolant in respective to a distribution branch pipe. The opening and closing of the electromagnetic stop valves are determined by the following conditions illustrated in FIG. 6:

1. When TE1>TE1S+X, SV1 opens.
   When TE2>TE2S+X, SV2 opens.
and the same for the other electromagnetic valves
2. When TE1≦TE1S+X, SV1 closes.
   When TE2≦TE2S+X, SV2 closes.
and the same for the other electromagnetic valves Furthermore, the detector T21 is used to detect the enviroment temperature TA1 of the room A1, and the detected temperature TA1 is transmitted to the control unit 251 for comparison with the set temperature TAS1, and a signal in correspondence to the comparison is generated to control the speed of the fan motor 261 so as to keep the temperature TA1 of room A1 within a preset range. In the same manner, the detector T22 is responsible for detection of the enviroment temperature TA2 of room A2 and the detected temperature TA2 is transmitted to the control unit 252 for comparison with the preset temperature TAS2 and a signal in correspondence to the comparison is generated to control the speed of the fan motor 262 so as to keep the enviroment temperature TA2 of room A2 within a preset range and the other rooms are also under the same control as cited above.

The speeds of the fan motors 261, 262 . . . are controlled by signals produced as a result of the comparisons of the enviroment temperatures TA1, TA2, . . . of rooms Al, A2 . . . detected by detectors T21, T22 . . . and delivered to the control units 251, 252 with preset temperatures TAS1, TAS2 . . . , as shown in FIG. 3. In other words, 1. When TA1>TAS1+X, the fan motor 261 runs at full blast.
   When TA2>TAS2+X, the fan motor 262 runs at full blast. and so on so forth.
2. When TAS1+X≧TA1≧TAS1−X, the speed of the fan motor 261 is proportional to the temperature TA1.
   When TAS2+X≧TA2≧TAS2−X, the speed of the fan motor 262 is proportional to the temperature TA2, and so on so forth.
3. When TA1<TAS1−X, the fan motor 261 operates at the minimum speed which can be set as zero.
   When TA2<TAS2−X, the fan motor 262 operates at the minimum speed which can be set as zero, and so on so forth.

Figure 7:
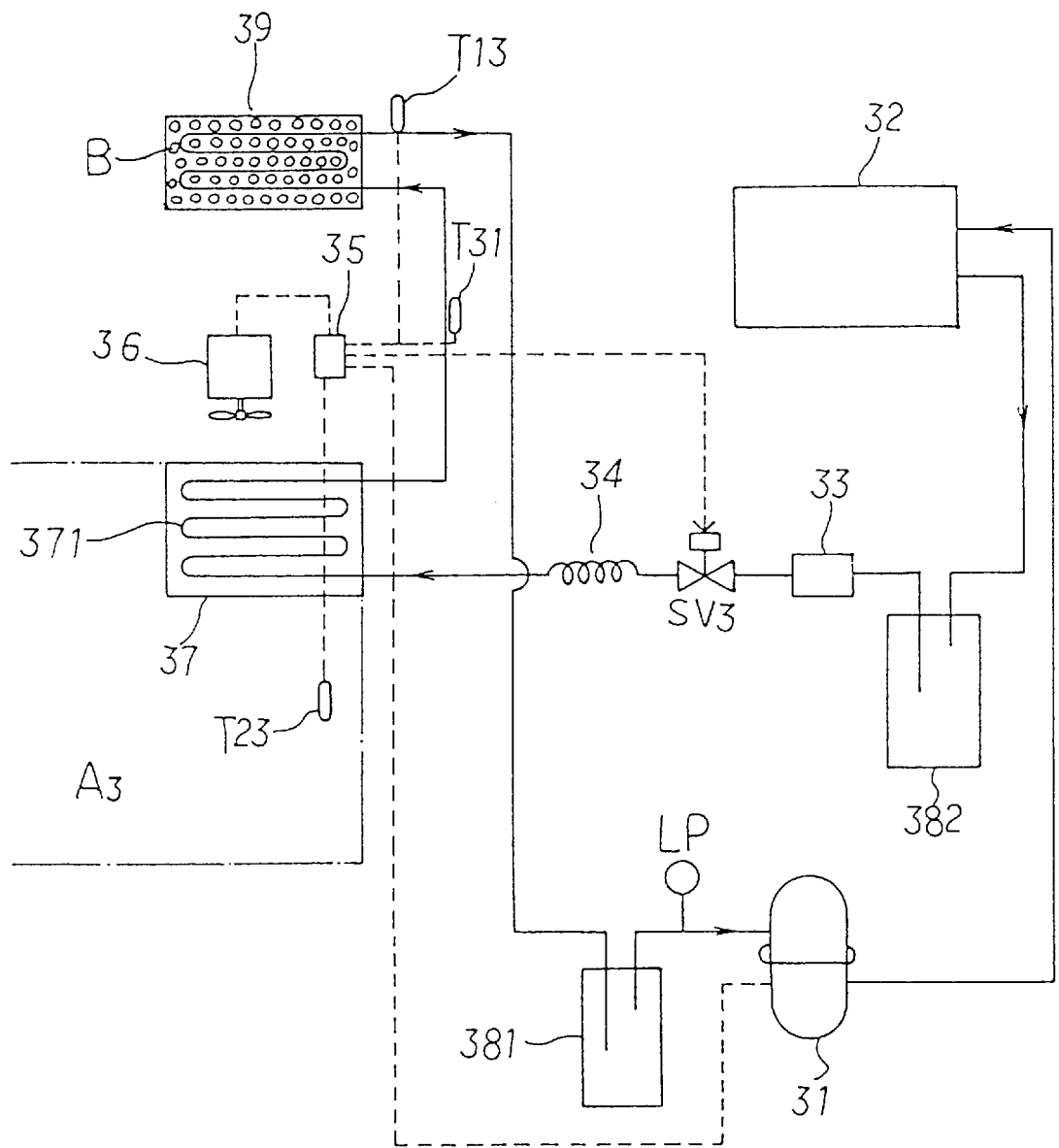
FIG. 7 is a diagram showing the systematic structure of the third embodiment.

Referring further to FIG. 7, the third embodiment of the present invention is illustrated. This is a system having an ice storage tank in cooperation with evaporating pipe assembly to directly store ice. It mainly comprises a compressor 31, a condenser 32, a dryer 33, an electromagnetic valve SV3, coolant volume controller 34, control unit 35, fan motor 36, an evaporator 37, an ice storage tank 39, a liquid collecting tank 382 and detectors T23, T31, T13. The air conditioning system is responsible for supplying cooled air to room A3.

In the ice storage tank 39 are disposed a plurality of ice balls or ice storing substance B so as to produce and store ice by way of off-peak electric power in advance, shifting the peak and off-peak electric power consumption effectively.

Detector T23 mainly detects the enviroment temperature TA of the room A3. When TA>TAS+X, TAS stands for a set enviroment temperature and X stands for a temperature difference, the control unit 35 will control the electromagnetic stop valve SV3 of the coolant to open so as to permit coolant to enter the evaporator 37 via the coolant volume controller 34. Meanwhile, the output temperature TE at the evaporating pipe assembly 371 is checked by the control unit 35 so as to determine if the compressor 31 is to operate to produce cooled air or not. The output temperature TE of the pipe assembly is detected by the detector T31. When the ice storage tank 39 still has ice stored inside, the electromagnetic stop valve SV3 opens to permit the coolant at a common room temperature (30° C.) and saturation pressure to enter the evaporator 37 via the coolant volume controller 34, absorbing heat to evaporate and then entering the ice storage tank 39 in exchange of heat so as to be converted into liquid coolant which is at 0° C. and saturation pressure. The liquid coolant will flow back again into the evaporator to absorb heat because liquid coolant has a large specific gravity so that it can naturally flow back into the evaporator and continually absorb heat in circulation until the ice stored in the ice storage tank 39 is fully melted away. The disappearance of ice in the tank 39 will cause the rise of the temperature in the tank 39, so do the temperature and the pressure of the coolant entering the evaporator 37 via the electromagnetic stop valve SV3 simultaneously (because of its state of saturation) until TE is higher than 5°–10° C. or is larger than X °C., indicating the heat absorbing capacity is not available any more and the compressor 31 must be turned on to operate.

After the compressor 31 runs, the Cooling capacity becomes proportional to the difference value of TA–TAS because the speed of the fan motor 36 is in positive proportion to the difference of TA–TAS, i.e., the cooling capacity is proportional to the air volume delivered per unit time. So, as the value of TA approaches the set value TAS, the air volume delivered per unit time decreases, accordingly the consumption of cooled air from the evaporator 37 becomes relatively low. In such a case, the compressor 31 continuing to operate will result in the extra cooling capacity which enables the ice storage tank 39 to produce ice therein. When the ice production process comes to an end in the ice storage tank 39, the output temperature TC of the ice storage tank 39, detected by the detector T13, drops apparently. As TC<TCS–X (TCS is the set temperature at the output temperature of the ice storage tank 39), the control unit 35 will cause the electromagnetic valve SV3 to close. At the moment, the compressor 31 will continue to operate, compressing the coolant into the condenser 32 in a liquid form and storing the same in a liquid collecting tank 382 until the pressure of a low-pressure switch LP drops below a preset pressure, the compressor 31 is stopped; or after X seconds of the closing of the electromagnetic valve, a time relay is used to stop the operation of the compressor 31 then.

Figure 8:
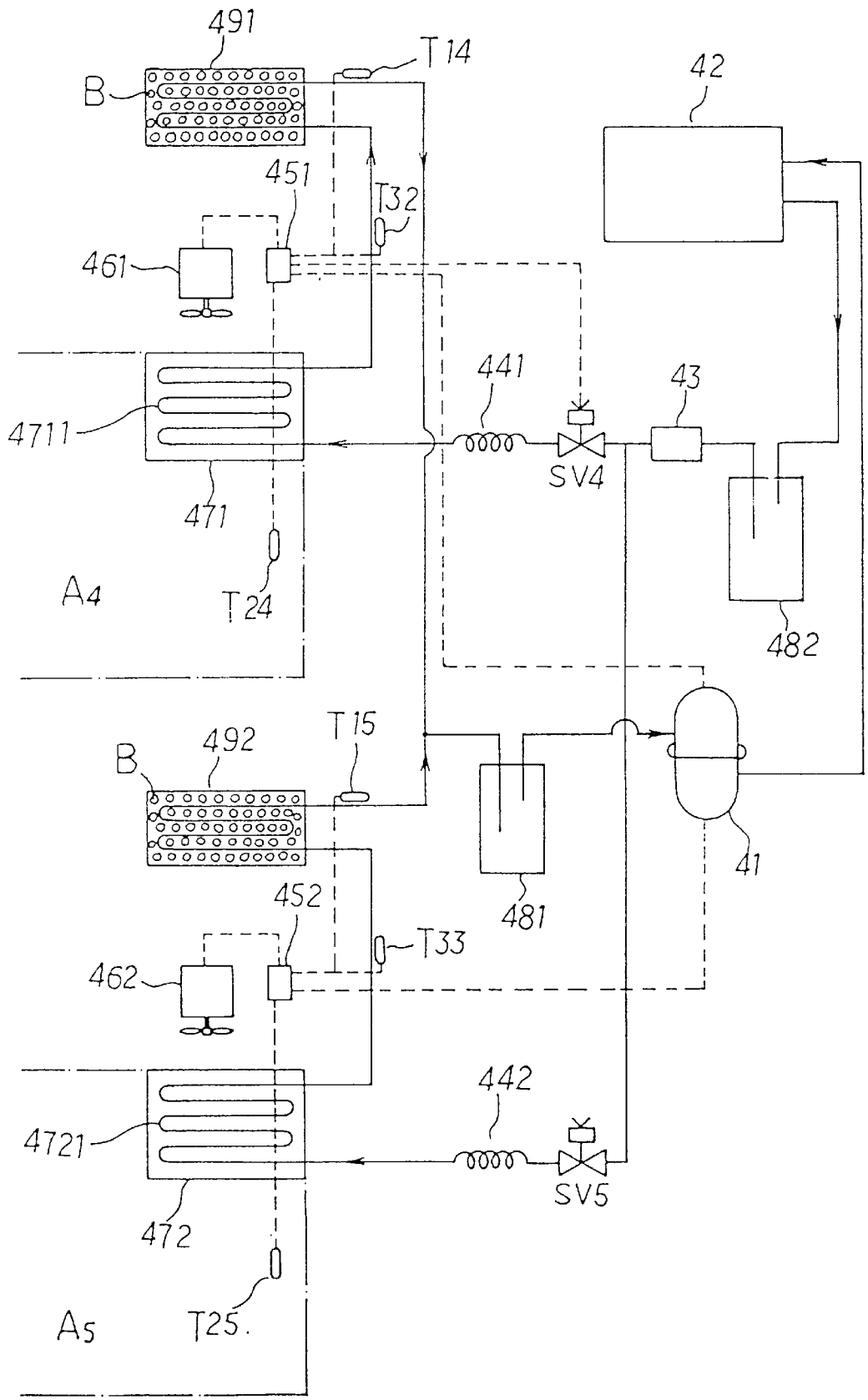
FIG. 8 is a diagram showing the systematic structure of the fourth embodiment.

Referring to FIG. 8, the fourth embodiment of the present invention is illustrated wherein more than one evaporator and ice storage tank are applied to the system cited in the third embodiment. It mainly comprises a compressor 41, a condenser 42, a dryer 43, liquid collecting tanks 481, 482 and two or more than two electromagnetic valves SV4, SV5 . . . , coolant volume control valves 441, 442 . . . , evaporators 471, 472 . . . , ice storage tanks 491, 492 . . . , control units 451, 452 . . . , fan motors 461, 462 . . . , detectors T14, T32, T24, T15 T33, T25 . . . , and is used to supply cooled air respectively to rooms A4, A5 . . . . The detectors T24, T25 . . . detects the enviroment temperatures TA1, TA2 . . . .

When TA1>TAS1+X, TAS1 is the set temperature of room A4, the control unit 451 will control the electromagnetic valve SV4 to open;

When TA1>TAS2+X. TAS2 is the set temperature of room A5, the control unit 452 will control the electromagnetic valve SV5 to open;

and so on so forth

At this moment, the compressor 41 is controlled by the signals transmitted by the control units 451, 452 . . . to operate or not according to the output temperatures TE of the evaporator pipe assemblies 4711, 4721, . . . . The output temperature TE of each evaporator assembly is detected by detector T32, T33 . . . . As long as one of the output temperature TE is larger than 5° C.–10° C., or X °C. which stands for a set temperature, the compressor 41 starts to operate.

When the ice storage tanks 491, 492 . . . still have ice stored therein, the individual electromagnetic stop valves SV4, SV5 . . . will be opened and the coolant in the liquid collecting tank 482, at room temperature (30° C.) and saturation pressure, will flow into the individual evaporators 471, 472 . . . via the coolant volume control valves 441, 442 . . . and absorb heat to evaporate; and then flowing into the ice storage tanks 491, 492, . . . with the heat therein removed and converted into liquid coolant. Such process will continue until all the stored ice in the ice storage tanks 491, 492 . . . is melted away, and the temperatures in the individual ice storage tanks 491, 492 . . . begin to rise with the temperatures and pressures of the coolant entering the evaporators 471, 472 . . . via the individual electromagne tic stop valves SV4, SV5 . . . rising simultaneously until one of the output temperatures TE of the evaporators is larger than 5°–10° C. or X °C., indicating the cooling capacity has not been available. The compressor 41 must be started to drive heat out. So, the control units 451, or 452 will deliver a control signal to turn on the compressor 41.

After the compressor 41 is started, the cooling capacity thereof is proportional to the differences of TA1–TA1S, TA2–TA2S, . . . , i.e., the cooling capacity is proportional to the difference between the enviroment temperature and a set temperature; and the cooling capacity is also in positive proportion to the air volumes delivered by the fan motors 461, 462 . . . . So, when TA1 approaches TA1S (or TA2 approaches TA2S), the air volume delivered drops, the consumption of cooling capacity in the evaporators 471, 472 . . . decreases accordingly. The continual running of the compressor 41 will result in the generation of extra cooling capacity which can be used to produce ice in the ice storage tanks 491, 492 . . . . When the ice production process comes to an end, the output temperatures TC of the individual ice storage tanks 491, 492 . . . , detected respectively by detectors T14, T15, apparently drops.

When TC<TCS–X (TC is the set output temperature of an ice storage tank), the individual control units 451, 452 . . . will control the respective electromagnetic stop valves SV4, SV5 . . . that control the individual branch pipes to close according to the condition of TC<TCS–X of individual branch pipes. At this moment, the compressor continues operating and compresses coolant in the condenser 42 into a liquid form which is stored in the liquid collecting tank 482 until the pressure of a low-pressure switch LP drops below a set pressure (or after X seconds of the total closure of the individual electromagnetic stop valves), the compressor then comes to a halt.

All the cited detectors T10, T11, T12, T13, T31, T14, T32, T15, T33 are of thermal sensitive type and are used to detect the output temperatures of the evaporators or ice storage tanks. According to the comparison results of the detected temperatures TE, TC, . . . and the set temperatures TES, TCS . . . , the ice storage capacity of the evaporator pipe assemblies or ice storage tanks and the volume of stored ice is then controlled.

However, in the present invention the control based on thermal variations is not the only way, other control techniques, such as photoelectric art (infrared) or pressure detection art can effect the same purpose.

Taking the photoelectric art or pressure detection as example, infrared sensors or pressure sensors are used as detectors T10, T11 . . . , and the detected values TE, TC . . . are the thickness of stored ice or the pressures of the coolant. In the same manner, the detected values and the set values are compared so as to control the on and off of the compressor 11, or the open and close of the electromagnetic stop valves by way of the control systems illustrated in FIGS. 1, 5, and 6. The installation of such detecting sensors are is based on the principle that the locations of the sensors on the pipe assemblies of the evaporators and the ice storage tanks will permit the sensors to pick up the best detection information thereat.

I claim:

1. An air conditioning system with supplemental ice storing and cooling capacity basically comprising a compressor, a condenser, a dryer, a coolant volume controller, a control unit, a fan motor, an evaporator having a pipe assembly and sensors being characterized by that one said sensor being mounted onto a back-flow pipe of said evaporator for detecting the output temperature thereof, and said detected temperature being compared with a preset temperature by way of said control unit, producing and delivering a corresponding signal to control the on and off of said compressor in combination with the speed variation of said fan motor so as to lowering the temperature of circulated coolant of said air conditioning system and produce and store ice in said pipe assembly of said evaporator in a proper amount whereby as said compressor stops functioning, said fan motor is able to continue delivering cooled air with the help of said stored ice to an enclosed room, prolonging the on/off span of each cycle of said compressor and preventing the moisture accumulated in said pipe assembly from being fed back into said enclosed room.

2. An air conditioning system as claimed in claim 1 wherein one of said sensors is installed inside an air conditioned room for detecting the enviroment temperature of said room.

3. An air conditioning system as claimed in claim 1 wherein one or more than one said evaporator is installed in said system, each said evaporator is mounted onto a distribution branch pipe of said system with each said evaporator equipped with an electromagnetic stop valve, a coolant volume controller, a control unit, a fan motor and two sensors one of which is installed at the back-flow pipe of said evaporator for detecting the output temperature of said evaporator, said detected output temperature being compared with a preset temperature by way of said control unit so as to produce a corresponding signal to control the opening or closing of said electromagnetic valve and the on and off of said compressor whereby a proper amount of ice can be produced and stored in said pipe assembly of said evaporator.

4. An air conditioning system as claimed in claim 3 wherein one or more than one evaporator is used, each being mounted onto each said distribution branch pipe with an ice storage tank engaged with each said evaporator.

5. An air conditioning system as claimed in claim 1 wherein said evaporator is in combination with an ice storage tank having a back-flow pipe, one sensor being mounted onto said back-flow pipe of said ice storage tank for detection of the output temperature of said ice storage tank; one sensor being mounted onto the back-flow pipe of said evaporator for detection of the output temperature thereof; one sensor being installed inside an air conditioned room for detection of an enviroment temperature of said room; all said detected temperatures being compared with preset, temperatures by way of said control units so as to deliver a corresponding control signal to control the opening and closing of an electromagnetic valve and the on and off of said compressor accordingly.

6. An air conditioning system as claimed in claims 5 wherein one or more than one evaporator is used, each being mounted onto each said distribution branch pipe with an ice storage tank engaged with each said evaporator.

7. An air conditioning system with supplemental ice storing and cooling capacity basically comprising a compressor, a condenser, a dryer, a coolant volume controller, a control unit, a fan motor, an evaporator having a pipe assembly and sensors, one of said sensors being an infrared sensor mounted onto a back-flow pipe of said evaporator for detecting a thickness of stored ice thereof, said detected thickness being compared with a preset thickness of stored ice by said control unit, producing and delivering a corresponding signal to control the on and off of said compressor in combination with the speed variation of said fan motor so as to lowering the temperature of circulated coolant of said air conditioning system and produce and store ice in said pipe assembly of said evaporator in a proper amount whereby as said compressor stops functioning, said fan motor is able to continue delivering cooled air with the help of said stored ice to an enclosed room, prolonging the on/off span of each cycle of said compressor and preventing the moisture accumulated in said pipe assembly from being fed back into said enclosed room.

8. An air conditioning system with supplemental ice storing and cooling capacity basically comprising a compressor, a condenser, a dryer, a coolant volume controller, a control unit, a fan motor, an evaporator having a pipe assembly and sensor, one of said sensors being a pressure sensor being mounted onto a back-flow pipe of said evaporator for detecting a pressure of a coolant thereof, said detected pressure being compared with a preset pressure by said control unit, producing and delivering a corresponding signal to control the on and off of said compressor in combination with the speed variation of said fan motor so as to lowering the temperature of circulated coolant of said air conditioning system and produce and store ice in said pipe assembly of said evaporator in a proper amount whereby as said compressor stops functioning, said fan motor is able to continue delivering cooled air with the help of said stored ice to an enclosed room, prolonging the on/off span of each cycle of said compressor and preventing the moisture accumulated in said pipe assembly from being fed back into said enclosed room.

* * * * *